US011194098B2

(12) United States Patent
Waldern et al.

(10) Patent No.: US 11,194,098 B2
(45) Date of Patent: Dec. 7, 2021

(54) WAVEGUIDE GRATING DEVICE

(71) Applicants: DigiLens Inc., Sunnyvale, CA (US); Rockwell Collins Inc., Cedar Rapids, IA (US)

(72) Inventors: Jonathan David Waldern, Los Altos Hills, CA (US); Alastair John Grant, San Jose, CA (US); Milan Momcilo Popovich, Leicester (GB); James H. Stanley, Cedar Rapids, IA (US); Robert D. Brown, Cedar Rapids, IA (US)

(73) Assignees: DigiLens Inc., Sunnyvale, CA (US); Rockwell Collins Inc., Cedar Rapids, IA (US)

( * ) Notice: Subject to any disclaimer, the term of this patent is extended or adjusted under 35 U.S.C. 154(b) by 69 days.

(21) Appl. No.: 16/734,208

(22) Filed: Jan. 3, 2020

(65) Prior Publication Data

US 2020/0142131 A1     May 7, 2020

Related U.S. Application Data

(63) Continuation of application No. 16/178,104, filed on Nov. 1, 2018, now Pat. No. 10,527,797, which is a
(Continued)

(51) Int. Cl.
*G02B 6/34*     (2006.01)
*G02B 5/18*     (2006.01)
(Continued)

(52) U.S. Cl.
CPC .............. *G02B 6/34* (2013.01); *G02B 5/1819* (2013.01); *G02B 5/1823* (2013.01); *G02B 5/32* (2013.01);
(Continued)

(58) Field of Classification Search
CPC ...... G02B 6/0018; G02B 6/0016; G02B 6/34; G02B 6/1819; G02B 6/1823; G02B 6/124;
(Continued)

(56) References Cited

U.S. PATENT DOCUMENTS

| 4,860,294 A | 8/1989 | Winzer et al. |
| 5,033,814 A | 7/1991 | Brown et al. |

(Continued)

FOREIGN PATENT DOCUMENTS

| CN | 101793555 A | 8/2010 |
| CN | 101945612 A | 1/2011 |

(Continued)

OTHER PUBLICATIONS

International Preliminary Report on Patentability for International Application No. PCT/GB2016/000036, issued Aug. 29, 2017, dated Sep. 8, 2017, 8 pgs.
(Continued)

*Primary Examiner* — Thomas A Hollweg
*Assistant Examiner* — Mary A El-Shammaa
(74) *Attorney, Agent, or Firm* — KPPB LLP

(57) ABSTRACT

An optical waveguide comprises at least two TIR surface and contains a grating. Input TIR light with a first angular range along a first propagation direction undergoes at least two diffractions at the grating. Each diffraction directs light into a unique TIR angular range along a second propagation direction.

20 Claims, 5 Drawing Sheets

Related U.S. Application Data continuation of application No. 15/807,149, filed on Nov. 8, 2017, now Pat. No. 10,156,681, which is a continuation of application No. 15/468,536, filed on Mar. 24, 2017, now Pat. No. 9,823,423, which is a continuation of application No. 14/620,969, filed on Feb. 12, 2015, now Pat. No. 9,632,226.

(51) Int. Cl.
   *G02B 27/42* (2006.01)
   *G02B 27/01* (2006.01)
   *G02F 1/1334* (2006.01)
   *G02B 5/32* (2006.01)
   *G02B 6/124* (2006.01)
   *F21V 8/00* (2006.01)

(52) U.S. Cl.
   CPC ........... *G02B 6/0016* (2013.01); *G02B 6/124* (2013.01); *G02B 27/0172* (2013.01); *G02B 27/4205* (2013.01); *G02B 27/4261* (2013.01); *G02F 1/13342* (2013.01); *G02B 2027/0125* (2013.01)

(58) Field of Classification Search
   CPC .... G02B 6/29307; G02B 5/1814; G02B 5/32; G02B 17/086; G02B 27/0172; G02B 27/0101; G02B 27/4272; G02B 27/4205; G02B 27/4261; G02B 2027/0125; G02F 1/13342
   See application file for complete search history.

(56) References Cited

U.S. PATENT DOCUMENTS

| | | |
|---|---|---|
| 5,035,734 A | 7/1991 | Honkanen et al. |
| 5,150,234 A | 9/1992 | Takahashi et al. |
| 5,306,923 A | 4/1994 | Kazmierski et al. |
| 5,528,720 A | 6/1996 | Winston et al. |
| 5,680,411 A | 10/1997 | Ramdane et al. |
| 5,724,463 A | 3/1998 | Deacon et al. |
| 5,847,787 A | 12/1998 | Fredley et al. |
| 5,867,618 A | 2/1999 | Ito et al. |
| 5,903,395 A | 5/1999 | Rallison et al. |
| 6,118,908 A | 9/2000 | Bischel et al. |
| 6,156,243 A | 12/2000 | Kosuga et al. |
| 6,167,169 A | 12/2000 | Brinkman et al. |
| 6,317,528 B1 | 11/2001 | Gadkaree et al. |
| 6,323,970 B1 | 11/2001 | Popovich |
| 6,323,989 B1 | 11/2001 | Jacobson et al. |
| 6,407,724 B2 | 6/2002 | Waldern et al. |
| 6,456,584 B1 | 9/2002 | Nagata et al. |
| 6,522,794 B1 | 2/2003 | Bischel et al. |
| 6,522,795 B1 | 2/2003 | Jordan et al. |
| 6,534,977 B1 | 3/2003 | Duncan et al. |
| 6,750,996 B2 | 6/2004 | Jagt et al. |
| 6,919,003 B2 | 7/2005 | Ikeda et al. |
| 7,003,075 B2 | 2/2006 | Miyake et al. |
| 7,046,439 B2 | 5/2006 | Kaminsky et al. |
| 7,068,898 B2 | 6/2006 | Buretea et al. |
| 7,376,068 B1 | 5/2008 | Khoury |
| 7,376,307 B2 | 5/2008 | Singh et al. |
| 7,587,110 B2 | 9/2009 | Singh et al. |
| 7,691,248 B2 | 4/2010 | Ikeda et al. |
| 7,984,884 B1 | 7/2011 | Iliev et al. |
| 8,933,144 B2 | 1/2015 | Enomoto et al. |
| 9,253,359 B2 | 2/2016 | Takahashi |
| 9,377,623 B2 | 6/2016 | Robbins et al. |
| 9,516,193 B2 | 12/2016 | Aramaki |
| 9,671,612 B2 | 6/2017 | Kress et al. |
| 9,804,316 B2 | 10/2017 | Drolet et al. |
| 9,823,423 B2 | 11/2017 | Waldern et al. |
| 10,088,686 B2 | 10/2018 | Robbins et al. |
| 10,089,516 B2 | 10/2018 | Popovich et al. |
| 10,156,681 B2 | 12/2018 | Waldern et al. |
| 10,185,154 B2 | 1/2019 | Popovich et al. |
| 10,209,517 B2 | 2/2019 | Popovich et al. |
| 10,234,696 B2 | 3/2019 | Popovich et al. |
| 10,330,777 B2 | 6/2019 | Popovich et al. |
| 10,359,736 B2 | 7/2019 | Popovich et al. |
| 10,409,144 B2 | 9/2019 | Popovich et al. |
| 10,423,813 B2 | 9/2019 | Popovich et al. |
| 10,459,311 B2 | 10/2019 | Popovich et al. |
| 10,527,797 B2 | 1/2020 | Waldern et al. |
| 10,545,346 B2 | 1/2020 | Waldern et al. |
| 10,678,053 B2 | 6/2020 | Waldern et al. |
| 10,690,916 B2 | 6/2020 | Popovich et al. |
| 10,705,281 B2 | 7/2020 | Fattal et al. |
| 10,859,768 B2 | 12/2020 | Popovich et al. |
| 10,890,707 B2 | 1/2021 | Waldern et al. |
| 2001/0046142 A1 | 11/2001 | Van Santen et al. |
| 2002/0093701 A1 | 7/2002 | Zhang et al. |
| 2002/0150032 A1 | 10/2002 | Nishiuchi et al. |
| 2003/0063884 A1 | 4/2003 | Smith et al. |
| 2003/0175004 A1 | 9/2003 | Garito et al. |
| 2003/0197154 A1 | 10/2003 | Manabe et al. |
| 2003/0206329 A1 | 11/2003 | Ikeda et al. |
| 2004/0012833 A1 | 1/2004 | Newswanger et al. |
| 2004/0047938 A1 | 3/2004 | Kosuga et al. |
| 2004/0057138 A1 | 3/2004 | Tanijiri et al. |
| 2004/0075830 A1 | 4/2004 | Miyake et al. |
| 2004/0156008 A1 | 8/2004 | Reznikov et al. |
| 2004/0184156 A1 | 9/2004 | Gunn, III et al. |
| 2004/0225025 A1 | 11/2004 | Sullivan et al. |
| 2005/0083564 A1 | 4/2005 | Mallya et al. |
| 2005/0174321 A1 | 8/2005 | Ikeda et al. |
| 2005/0218377 A1 | 10/2005 | Lawandy |
| 2005/0231774 A1 | 10/2005 | Hayashi et al. |
| 2005/0259217 A1 | 11/2005 | Lin et al. |
| 2006/0002274 A1 | 1/2006 | Kihara et al. |
| 2006/0093012 A1 | 5/2006 | Singh et al. |
| 2006/0142455 A1 | 6/2006 | Agarwal et al. |
| 2006/0164593 A1 | 7/2006 | Peyghambarian et al. |
| 2006/0181683 A1 | 8/2006 | Bhowmik et al. |
| 2006/0215976 A1 | 9/2006 | Singh et al. |
| 2006/0292493 A1 | 12/2006 | Shinotsuka et al. |
| 2007/0182915 A1 | 8/2007 | Osawa et al. |
| 2008/0193085 A1 | 8/2008 | Singh et al. |
| 2009/0169152 A1 | 7/2009 | Oestergard |
| 2010/0225876 A1 | 9/2010 | Escuti et al. |
| 2011/0221656 A1 | 9/2011 | Haddick et al. |
| 2013/0016362 A1 | 1/2013 | Gong et al. |
| 2013/0301014 A1 | 11/2013 | DeJong et al. |
| 2014/0009809 A1 | 1/2014 | Pyun et al. |
| 2014/0140653 A1 | 5/2014 | Brown et al. |
| 2014/0140654 A1 | 5/2014 | Brown et al. |
| 2014/0168735 A1 | 6/2014 | Yuan et al. |
| 2014/0255662 A1 | 9/2014 | Enomoto et al. |
| 2015/0086907 A1 | 3/2015 | Mizuta et al. |
| 2015/0125109 A1 | 5/2015 | Robbins et al. |
| 2015/0177686 A1 | 6/2015 | Lee et al. |
| 2015/0247975 A1 | 9/2015 | Abovitz et al. |
| 2015/0268399 A1 | 9/2015 | Futterer |
| 2015/0309264 A1 | 10/2015 | Abovitz et al. |
| 2016/0097959 A1 | 4/2016 | Bruizeman et al. |
| 2016/0178901 A1 | 6/2016 | Ishikawa |
| 2016/0231570 A1 | 8/2016 | Levola et al. |
| 2016/0283773 A1 | 9/2016 | Popovich et al. |
| 2016/0336033 A1 | 11/2016 | Tanaka |
| 2017/0010466 A1 | 1/2017 | Klug et al. |
| 2017/0032166 A1 | 2/2017 | Raguin et al. |
| 2017/0059775 A1 | 3/2017 | Coles et al. |
| 2017/0357841 A1 | 12/2017 | Popovich et al. |
| 2018/0059305 A1 | 3/2018 | Popovich et al. |
| 2018/0074265 A1 | 3/2018 | Waldern et al. |
| 2018/0081190 A1 | 3/2018 | Lee et al. |
| 2018/0107011 A1 | 4/2018 | Lu et al. |
| 2018/0275402 A1 | 9/2018 | Popovich et al. |
| 2018/0373115 A1 | 12/2018 | Brown et al. |
| 2019/0042827 A1 | 2/2019 | Popovich et al. |
| 2019/0072723 A1 | 3/2019 | Waldern et al. |
| 2019/0094548 A1 | 3/2019 | Nicholson et al. |
| 2019/0113829 A1 | 4/2019 | Waldern et al. |

(56) References Cited

U.S. PATENT DOCUMENTS

| | | | |
|---|---|---|---|
| 2019/0212195 A9 | 7/2019 | Popovich et al. |
| 2019/0212588 A1 | 7/2019 | Waldern et al. |
| 2019/0212596 A1 | 7/2019 | Waldern et al. |
| 2019/0212597 A1 | 7/2019 | Waldern et al. |
| 2019/0212698 A1 | 7/2019 | Waldern et al. |
| 2019/0319426 A1 | 10/2019 | Lu et al. |
| 2019/0339558 A1 | 11/2019 | Waldern et al. |
| 2020/0026074 A1 | 1/2020 | Waldern et al. |
| 2020/0081317 A1 | 3/2020 | Popovich et al. |
| 2020/0159026 A1 | 5/2020 | Waldern et al. |
| 2020/0201051 A1 | 6/2020 | Popovich et al. |
| 2020/0249484 A1 | 8/2020 | Waldern et al. |
| 2020/0292745 A1 | 9/2020 | Waldern et al. |
| 2020/0341194 A1 | 10/2020 | Waldern et al. |
| 2020/0348519 A1 | 11/2020 | Waldern et al. |

FOREIGN PATENT DOCUMENTS

| | | |
|---|---|---|
| CN | 102498425 A | 6/2012 |
| CN | 102782563 A | 11/2012 |
| CN | 102928981 A | 2/2013 |
| CN | 103562802 A | 2/2014 |
| CN | 104040308 A | 9/2014 |
| CN | 104040410 A | 9/2014 |
| CN | 103823267 B | 5/2019 |
| CN | 110383117 A | 10/2019 |
| CN | 111684362 A | 9/2020 |
| CN | 107466372 B | 1/2021 |
| DE | 102013209436 A1 | 11/2014 |
| EP | 3548939 A2 | 10/2019 |
| EP | 3710894 A1 | 9/2020 |
| FI | 20176157 A1 | 6/2019 |
| FI | 20176161 A1 | 6/2019 |
| JP | 57089722 A | 6/1982 |
| JP | 10096903 A | 4/1998 |
| JP | 2002311379 A | 10/2002 |
| JP | 2007094175 A | 4/2007 |
| JP | 2009132221 A | 6/2009 |
| JP | 2012533089 A | 12/2012 |
| JP | 2016030503 A | 3/2016 |
| JP | 6598269 B2 | 10/2019 |
| JP | 6680793 B2 | 3/2020 |
| JP | 2020514783 A | 5/2020 |
| JP | 6734933 B2 | 7/2020 |
| JP | 2021509736 A | 4/2021 |
| KR | 10-2020-0106932 A | 9/2020 |
| WO | 2004109349 A2 | 12/2004 |
| WO | 2013190257 A1 | 12/2013 |
| WO | 2015015138 A1 | 2/2015 |
| WO | 2016044193 A1 | 3/2016 |
| WO | 2016116733 A1 | 7/2016 |
| WO | 2016135434 A1 | 9/2016 |
| WO | 2016156776 A1 | 10/2016 |
| WO | 2016181108 A1 | 11/2016 |
| WO | 2016046514 A8 | 4/2017 |
| WO | 2017094129 A1 | 6/2017 |
| WO | 2017162999 A8 | 9/2017 |
| WO | 2017178781 A1 | 10/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018096359 A3 | 7/2018 |
| WO | 2018150163 A1 | 8/2018 |
| WO | 2018206487 A1 | 11/2018 |
| WO | 2019077307 A1 | 4/2019 |
| WO | 2019079350 A2 | 4/2019 |
| WO | 2019122806 A1 | 6/2019 |
| WO | 2019135784 A1 | 7/2019 |
| WO | 2019135837 A1 | 7/2019 |
| WO | 2019171038 A1 | 9/2019 |
| WO | 2019185973 A1 | 10/2019 |
| WO | 2019185975 A1 | 10/2019 |
| WO | 2019185976 A1 | 10/2019 |
| WO | 2019185977 A1 | 10/2019 |
| WO | 2019217453 A1 | 11/2019 |
| WO | 2020186113 A1 | 9/2020 |
| WO | 2020212682 A1 | 10/2020 |
| WO | 2020227236 A1 | 11/2020 |
| WO | 2021032982 A1 | 2/2021 |
| WO | 2021032983 A1 | 2/2021 |
| WO | 2021044121 A1 | 3/2021 |

OTHER PUBLICATIONS

International Preliminary Report on Patentability for International Application No. PCT/GB2016/000051, Report issued Sep. 19, 2017, dated Sep. 28, 2017, 7 Pgs.
International Preliminary Report on Patentability for International Application No. PCT/GB2016/000065, issued Oct. 3, 2017, dated Oct. 12, 2017, 8 pgs.
International Preliminary Report on Patentability for International Application No. PCT/US2018/012227, Report issued Jul. 30, 2019, dated Aug. 8, 2019, 7 Pgs.
International Preliminary Report on Patentability for International Application No. PCT/US2019/012758, Report issued Jul. 14, 2020, dated Jul. 23, 2020, 4 Pgs.
International Preliminary Report on Patentability for International Application No. PCT/US2019/012759, Report issued Jul. 14, 2020, dated Jul. 23, 2020, 6 Pgs.
International Preliminary Report on Patentability for International Application PCT/GB2017/000055, issued Oct. 16, 2018, dated Oct. 25 2018, 9 pgs.
International Preliminary Report on Patentability for International Application PCT/US2018/048960, Report issued on Mar. 3, 2020, dated Mar. 12, 2020, 7 Pgs.
International Preliminary Report on Patentability for International Application PCT/US2019/012764, Report issued Jul. 14, 2020, dated Jul. 23, 2020, 5 Pgs.
International Preliminary Report on Patentability for International Application PCT/GB2017/000040, Report issued Sep. 25, 2018 , dated Oct. 4, 2018, 7 pgs.
International Search Report and Written Opinion for International Application No. PCT/US2019/031163, Search completed Jul. 9, 2019, dated Jul. 29, 2019, 11 Pgs.
International Search Report and Written Opinion for International Application No. PCT/GB2016/000036, completed Jul. 4, 2016, dated Jul. 13, 2016, 10 pgs.
International Search Report and Written Opinion for International Application No. PCT/GB2016/000065, completed Jul. 14, 2016, dated Jul. 27, 2016, 10 pgs.
International Search Report and Written Opinion for International Application No. PCT/US2018/012227, Search completed Feb. 28, 2018, dated Mar. 14, 2018, 8 Pgs.
International Search Report and Written Opinion for International Application No. PCT/US2018/037410, Search completed Aug. 16, 2018, dated Aug. 30, 2018, 11 Pgs.
International Search Report and Written Opinion for International Application No. PCT/US2018/048636, Search completed Nov. 1, 2018, dated Nov. 15, 2018, 16 Pgs.
International Search Report and Written Opinion for International Application No. PCT/US2018/056150, Search completed Dec. 4, 2018, dated Dec. 26, 2018, 10 Pgs.
International Search Report and Written Opinion for International Application No. PCT/US2018/062835, Search completed Jan. 14, 2019, dated Jan. 31, 2019, 14 Pgs.
International Search Report and Written Opinion for International Application No. PCT/US2019/043496, Search completed Sep. 28, 2019, dated Nov. 14, 2019, 12 Pgs.
International Search Report and Written Opinion for International Application No. PCT/US2020/022482, Search completed May 12, 2020, dated Jun. 9, 2020, 11 Pgs.
International Search Report and Written Opinion for International Application No. PCT/US2020/031363, completed May 28, 2020, dated Jun 10, 2020, 8 Pgs.
International Search Report for PCT/GB2016/000051, Completed Aug. 11, 2016, 3 Pgs.

(56) References Cited

OTHER PUBLICATIONS

Supplementary Partial European Search Report for European Application No. 18727645.6, Search completed Jul. 2, 2020, dated Jul. 13, 2020, 13 Pgs.

Written Opinion for International Application No. PCT/GB2016/000051, Search completed Aug. 11, 2016, dated Aug. 22, 2016, 6 Pgs.

Dabrowski, "High Birefringence Liquid Crystals", Crystals, Sep. 3, 2013, vol. 3, No. 3, pp. 443-482.

Fuh et al., "Thermally and Electrically Switchable Gratings Based Upon the Polymer-Balls Type Polymer-Dispersed Liquid Crystal Films", Appl. Phys. vol. vol. 41, No. 22, Aug. 1, 2002, pp. 4585-4589.

Gerritsen et al., "Application of Kogelnik's two-wave theory to deep, slanted, highly efficient, relief transmission gratings", Applied Optics, Mar. 1, 1991, vol. 30; No. 7, pp. 807-814.

Golub et al., "Bragg properties of efficient surface relief gratings in the resonance domain", Optics Communications, Feb. 24, 2004, vol. 235, pp. 261-267, doi: 10.1016/j.optcom.2004.02.069.

Jeong et al., "Memory Effect of Polymer Dispersed Liquid Crystal by Hybridization with Nanoclay", express Polymer Letters, vol. 4, No. 1, 2010, pp. 39-46.

Kim et al., "Fabrication of Reflective Holographic PDLC for Blue", Molecular Crystals and Liquid Crystals Science, 2001, vol. 368, pp. 3845-3853.

Moharam et al., "Diffraction characteristics of photoresist surface-relief gratings", Applied Optics, Sep. 15, 1984, vol. 23, pp. 3214-3220.

Natarajan et al., "Electro-Optical Switching Characteristics of Volume Holograms in Polymer Dispersed Liquid Crystals", J. of Nonlinear Optical Physics Materials, Jan. 1996, vol. 5, No. 1, pp. 89-98.

Sabel et al., "Simultaneous formation of holographic surface relief gratings and volume phase gratings in photosensitive polymer", Materials Research Letters, May 30, 2019, vol. 7, No. 10, pp. 405-411, doi: 10.1080/21663831.2019.1621956.

Sakhno et al., "Deep surface relief grating in azobenzene-containing materials using a low-intensity 532 nm laser", Optical Materials: X, Jan. 23, 2019, 100006, pp. 3-7, doi: 10.1016/j.omx.2019.100006.

Yang et al., "Robust and Accurate Surface Measurement Using Structured Light", IEEE, Apr. 30, 2008, vol. 57, Issue 6, pp. 1275-1280.

Yokomori, "Dielectric surface-relief gratings with high diffraction efficiency", Applied Optics, Jul. 15, 1984, vol. 23; No. 14, pp. 2303-2310.

Extended European Search Report for European Application No. 18727645.6, Search completed Oct. 14, 2020, dated Oct. 23, 2020, 13 Pgs.

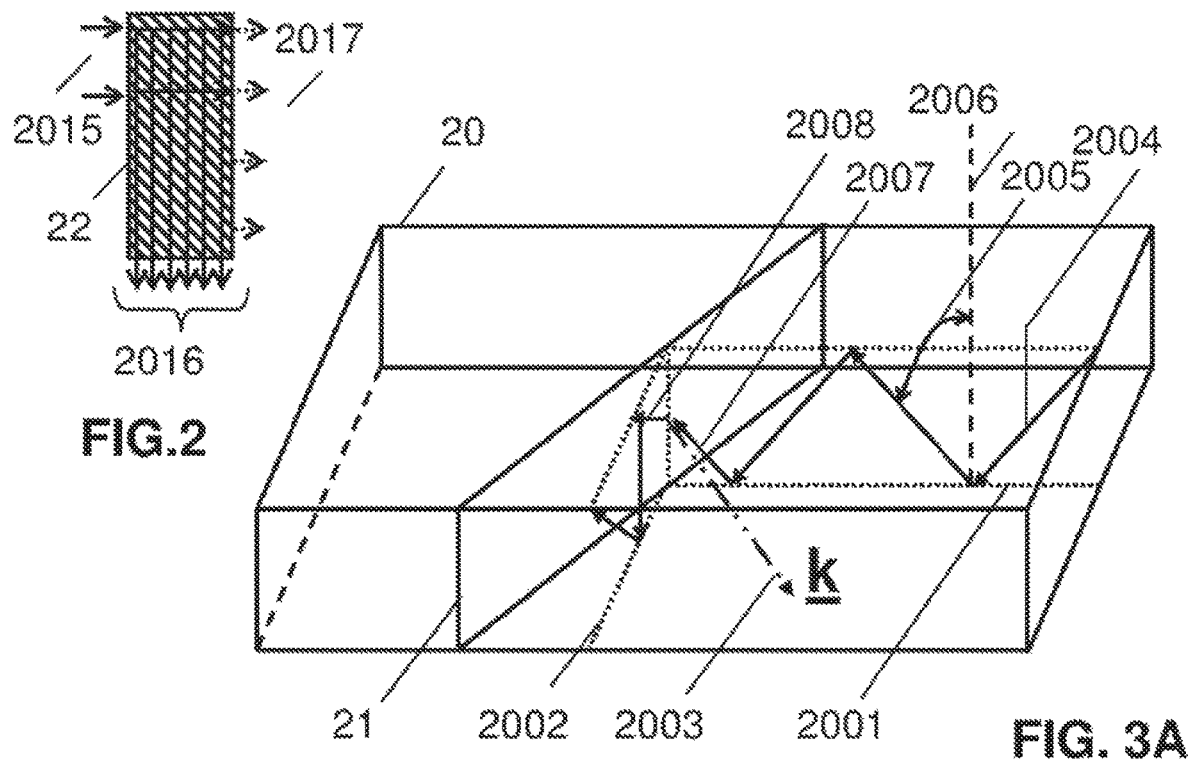
FIG. 2
FIG. 3A
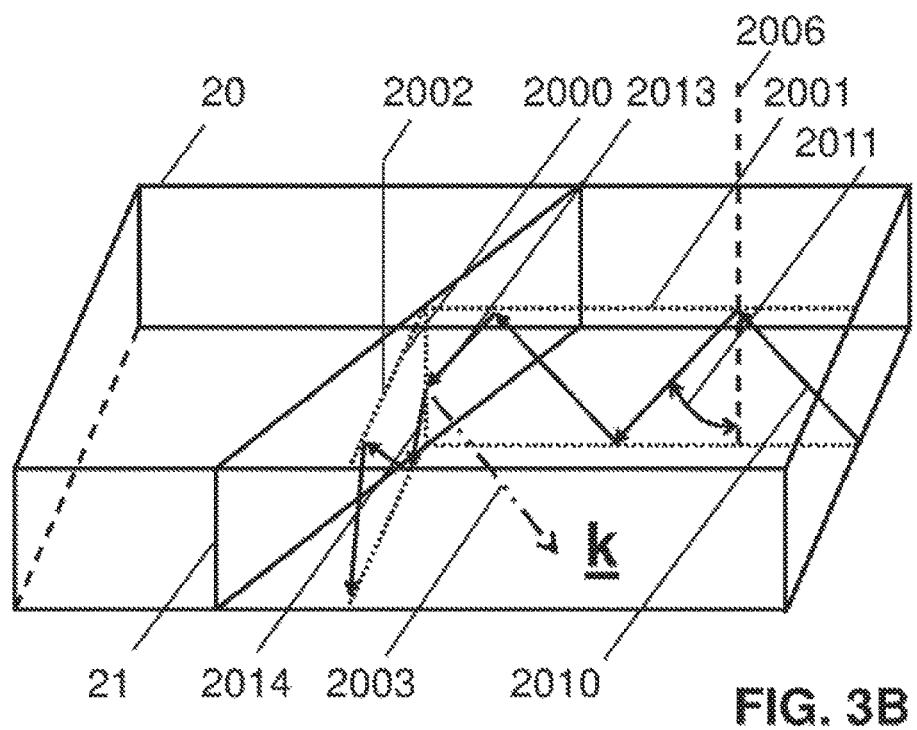
FIG. 3B

WAVEGUIDE GRATING DEVICE

CROSS REFERENCE TO PRIORITY APPLICATION

This application is a continuation of U.S. application Ser. No. 16/178,104 filed Nov. 1, 2018, which application is a continuation of U.S. application Ser. No. 15/807,149 filed Nov. 8, 2017, issued on Dec. 18, 2018 as U.S. Pat. No. 10,156,681, which is a continuation of U.S. application Ser. No. 15/468,536 filed Mar. 24, 2017, issued on Nov. 21, 2017 as U.S. Pat. No. 9,823,423, which is a continuation of U.S. application Ser. No. 14/620,969 filed Feb. 12, 2015, issued on Apr. 25, 2017 as U.S. Pat. No. 9,632,226, the disclosures of which are incorporated herein by reference in their entireties.

BACKGROUND OF THE INVENTION

This invention relates to a waveguide device, and more particularly to a waveguide holographic grating. Waveguide optics is currently being considered for a range of display and sensor applications for which the ability of waveguides to integrate multiple optical functions into a thin, transparent, lightweight substrate is of key importance. This new approach is stimulating new product developments including near-eye displays for Augmented Reality (AR) and Virtual Reality (VR), compact Heads Up Display (HUDs) for aviation and road transport and sensors for biometric and laser radar (LIDAR) applications. Waveguides are limited in terms of the range of ray angles that can be efficiently guided with a substrate. One solution addressed in the above references is to use holographic gratings for in-coupling and out-coupling light. However, while transmission holographic gratings perform these functions efficiently, their narrow angular bandwidth imposes even tighter angular limits on the image content that can be transmitted down a waveguide. Using the teachings contained in the above references it is possible to overcome these angular limitations by stacking or multiplexing gratings. Stacking is currently limited by holographic scatter while the number of gratings that can be multiplexed in a single waveguide is limited by current material modulation uniformity. One potentially very useful type of grating, called a fold grating, is unique in allowing changes in beam propagation direction and beam expansion to be accomplished in a single grating layer. However, prototype fold gratings have been found to have narrow angular bandwidths. There is therefore a need for a waveguide fold grating with an angular bandwidth that addresses the full angular capability of a waveguide.

SUMMARY OF THE INVENTION

It is a first object of the invention to provide a waveguide fold grating with an angular bandwidth that addresses the full angular capability of a waveguide.

The object of the invention is achieved in first embodiment of the invention in which there is provided an optical waveguide with least two TIR surfaces containing a grating. Input TIR light with a first angular range along a first propagation direction undergoes at least two diffractions, wherein each ray from the first angular range and its corresponding diffracted ray lie on the diffraction cone of the grating, wherein each diffraction provides a unique TIR angular range along a second propagation direction.

In one embodiment each ray from the first angular range and its corresponding diffracted ray are offset from the k-vector of the grating by an angle less than an angle at which the diffraction efficiency is a predefined fraction of the peak diffraction efficiency.

In one embodiment each unique TIR angular range provides a unique diffraction efficiency versus angle characteristic. In one embodiment the diffraction efficiency versus angle characteristics do not overlap. In one embodiment the diffraction efficiency versus angle characteristics overlap.

In one embodiment the angular separation of the diffracted ray vectors produced in the two diffractions is equal to the diffraction cone angle.

In one embodiment the grating is a leaky grating providing a multiplicity of diffractions, wherein only two diffractions are characterized by a unique pair of incident and diffracted ray vectors on the diffraction cone.

In one embodiment the grating is a Bragg grating or a SBG and is recorded in one of a HPDLC grating, uniform modulation grating or reverse mode HPDLC grating.

In one embodiment the diffracted light has a polarization state produced by aligning the average relative permittivity tensor of the grating, the polarization state being one of linearly, elliptically or randomly polarized.

In one embodiment non-diffracted light has a polarization state produced by aligning the average relative permittivity tensor of the grating, the polarization state being one of linearly, elliptically or randomly polarized.

In one embodiment the grating is one of a multiplexed set of gratings.

In one embodiment the grating has a spatially varying thickness.

In one embodiment the grating has spatially-varying diffraction efficiency.

In one embodiment the grating has spatially-varying k-vector directions.

In one embodiment the grating comprises an array of selectively switchable elements.

In one embodiment the diffracted light is transmitted through a TIR face of the waveguide.

In one embodiment the apparatus further comprises at least one of a waveguide input coupler for inputting light through a face of the waveguide and directing it into the first propagation path, and a waveguide output coupler for outputting the diffracted light through a face of the waveguide, wherein each of the input and output couplers is one of a grating or prism.

In one embodiment at least one of the waveguide input coupler and the waveguide output coupler is a grating configured such that grating reciprocity is satisfied within the waveguide.

In one embodiment the input light is modulated with temporally-varying angularly-distributed information content.

In one embodiment the waveguide has first and second parallel TIR surfaces, the grating diffracting light out of the first propagation direction into a second propagation direction, the grating characterized in that a portion of light reflected from the first TIR surface is diffracted into TIR along the second propagation direction in a first TIR angular range and a portion of light reflected from the second TIR surface is diffracted into TIR along the second propagation direction in a TIR range.

In one embodiment the first and second propagation direction are orthogonally disposed in the plane of the waveguide.

In one embodiment the apparatus further comprises a second grating overlaying the first grating. The second grating deflecting light in the first propagation direction into a second propagation direction within the waveguide, the second grating characterized in that a portion of light reflected from the first TIR surface is diffracted into TIR along the second propagation direction in a third TIR angular range and a portion of light reflected from the second TIR surface is diffracted into TIR along the second propagation direction in a fourth TIR angular range. In one embodiment the first and second gratings are multiplexed. In one embodiment each the third and fourth TIR angular ranges correspond to unique diffraction efficiency versus angle characteristics.

In one embodiment input TIR light width an angular range in a third propagation direction undergoes at least one diffraction along a unique vector on the diffraction cone of the grating. In one embodiment the first and the third propagation direction are in opposing directions. In one embodiment the TIR angular range of the input TIR light in the third propagation direction does not overlap with the diffraction efficiency versus angle characteristics of the light in the second propagation direction. In one embodiment the input TIR light in the first propagation direction and the input TIR light in third second propagation direction have different wavelengths. In one embodiment the grating multiplexes first and second gratings. Input TIR light in the first propagation direction is diffracted by the first multiplexed grating and input TIR light in the third propagation direction is diffracted by the second multiplexed grating. In one embodiment the apparatus further comprises a second grating for diffracting input TIR light travelling along the third propagation direction.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

BRIEF DESCRIPTION OF THE DRAWINGS

FIG. 2 is a schematic plan view illustrating the principles of a fold grating.

FIG. 3A is schematic illustration of a waveguide grating showing a first aspect of light diffraction in one embodiment.

FIG. 3B is schematic illustration of a waveguide grating showing a second aspect of light diffraction in one embodiment.

DETAILED DESCRIPTION OF THE INVENTION

The invention will now be further described by way of example only with reference to the accompanying drawings.

It will apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories. Parts of the following description will be presented using terminology commonly employed by those skilled in the art of optical design. It should also be noted that in the following description of the invention repeated usage of the phrase "in one embodiment" does not necessarily refer to the same embodiment.

Figure 1:
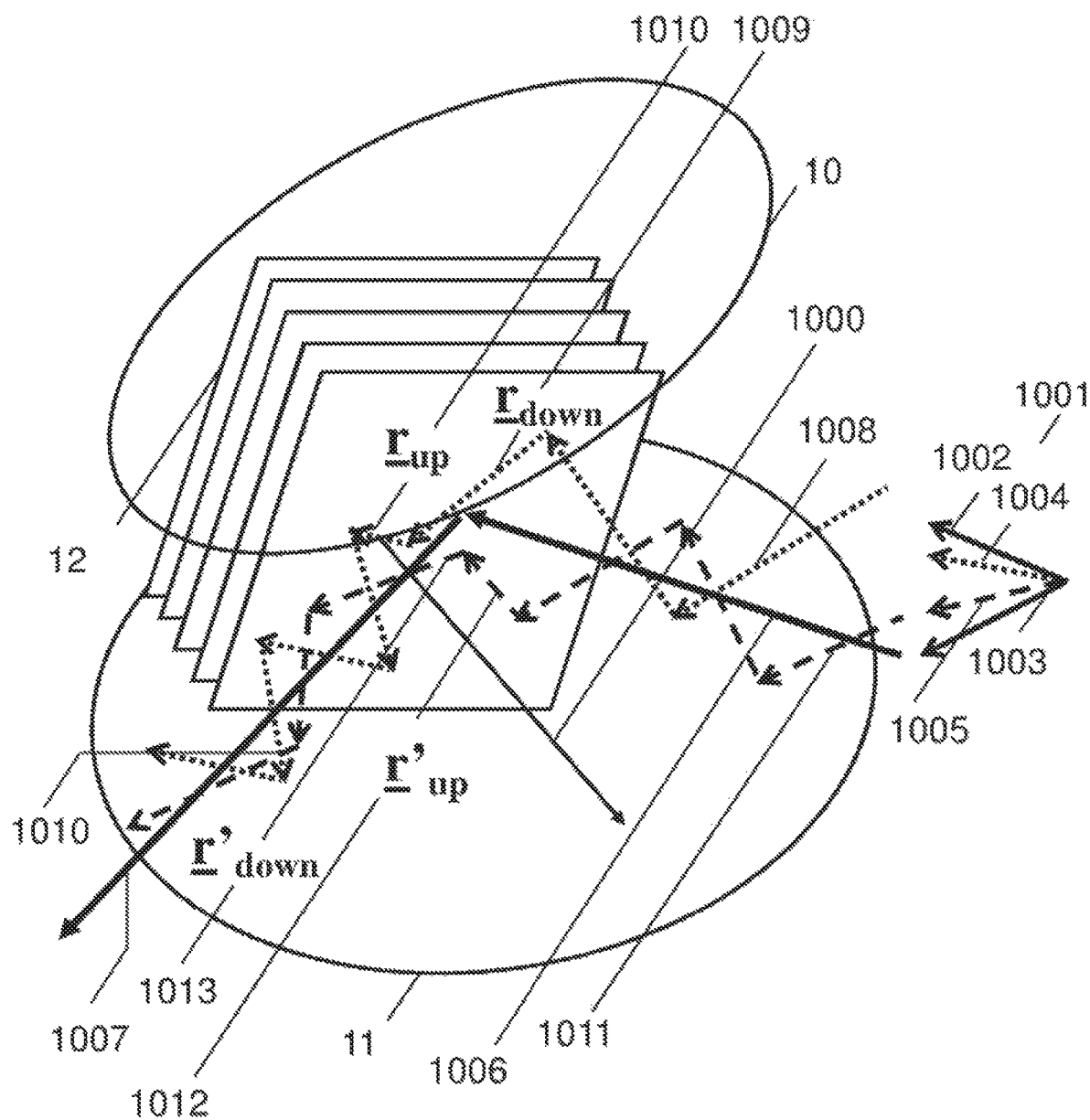
FIG. 1 is a schematic illustration of the optical geometry of a general waveguide grating in one embodiment.

FIG. 1 is a schematic illustration of a waveguide device according to the principles of the invention comprising: a waveguide having at least two total internal reflection (TIR) surfaces 10, 11 containing at least one grating 12. The TIR surfaces may be angled with respect to each other. The TIR surfaces will normally be planar. In some embodiments the TIR surfaces may be curved in one or two orthogonal directions. The grating has a k vector 1000, where a k-vector is conventionally defined as the unit vector normal to the grating fringe surfaces. A waveguide input coupler, which is not illustrated, couples input light 1001 with a multiplicity input ray angles as represented by the rays 1002-1005 into the waveguide. The waveguide input coupler may be a grating or prism. The invention does not assume any particular coupling means.

The ray 1004, which is the principal ray of a ray bundle covering a first angular range, is coupled in the TIR path 1008 in the first propagation direction 1006. The TIR path 1008 contains downward-going ray segments such as 1009 and upward-going ray segments such as 1010. For ease of explanation the ray segments 1009 and 1010 are also labelled by the vectors rdown and rup. The invention may be applied to a range of waveguide geometries in which tilted planar surfaces provide TIR. However, for the purpose of explaining the invention we invite the reader to visualize FIG. 1 as representing the simplest waveguide covered by the invention; that is, one with two parallel TIR surface. All TIR in this case takes place at these two surfaces. In the following description downward-going refers to TIR rays reflected from the top TIR surface and upward-going refers to rays reflected from the bottom TIR surface. In the case of waveguides with more than two TIR surfaces characterizing the ray paths simply in terms of upward or downward propagation is not practical; it is more appropriate to use vector formalism. (Note that for the purposes of the invention the term "propagation direction" refers to foe general direction of energy transfer of the TIR beams and not to the individual up-going and downward-going ray paths described above.) Referring again to FIG. 1 another TIR path having a different TIR angle (defined as the angle between the ray and the normal to the TIR surface) results from the input ray 1005, the principal ray of a ray bundle covering a second angular range, which is coupled into the TIR path 1011 contain upward-going ray segments such as 1012 and downward going ray segments such as 1013. The ray segments 1012 and 1013 are also labelled by the vectors r'up and r'down. The two TIR paths are deflected into a second propagation direction 1007. Hence the input light is diffracted least two times by the grating (each diffraction corresponding to a unique angular range). Only rays that exactly satisfy the Bragg equation will be diffracted with high efficiency. (Note that in the case where the grating is a leaky grating ie one in which a small amount of light is diffracted at each bounce only two bounces will give rise to a unique pair of incident and diffracted rays on the diffraction cone.) Incident rays and diffracted rays satisfying the Bragg condition lie on a surface approximating to a cone. In one particular case of interest the angular separation of the diffracted ray vectors produced in the two diffractions is equal to the diffraction cone angle. Rays not meeting the Bragg condition will have progressively lower diffraction efficiency with increasing angular (and wavelength) deviation from the on-Bragg angle (and wavelength) with the limiting condition typically being defined as 50% of the peak efficiency. Each of the diffracted ray paths corresponds to the peak efficiency ray of a unique range of diffracted ray angles. To ensure that most of the light is diffracted with high efficiency each input ray and its corresponding diffracted ray are offset from the diffraction cone of the grating by an angle less than half the diffraction efficiency angular bandwidth. The latter is frequently defined as the angle range over which the diffraction efficiency is greater than or equal to 50% of the peak efficiency. However, other measures of the limiting diffraction efficiency may be used in the present invention depending on factors such as the required light output uniformity. As we will see later, in some embodiments where the waveguide grating is used in a sensor it is advantageous to have non overlapping angular characteristics in order to separated illumination and signal light.

By configuring the grating to diffract upward-going and downward-going rays the angular range over which the grating operates is greatly expanded. This will be illustrated in the case of one particular fold grating design later in the description. In one embodiment each range of diffracted angles corresponding to the range of input rays having principal rays 1008, 1011 results a unique diffraction efficiency versus angle characteristic, where the angle referred to is that between incident or diffracted ray and the k-vector in the medium (glass or plastic). In most practical applications of the invention the angular measure of interest is the angular bandwidth in air. For example in the case of a waveguide display it is useful to specify the angular bandwidth of the display as observed from the eye box (or exit pupil). This or other measures of the angular bandwidth can be determined using basic geometrical optics. The diffraction efficiency versus angle characteristics may be engineered to overlap with the degree of overlap depending on the application. Where high uniformity is required a fairly high degree of overlap is required to remove effects such as banding. Later in the description we will describe how the waveguide grating may be used to provide more than one optical path through a waveguide (for example in an optical receiver/transmitter). In such applications it is desirable to keep the overlap between the diffraction efficiency versus angle characteristics to a minimum to avoid crosstalk between the receive and transmit channels.

The grating used in the invention is desirably a Bragg grating (also referred to as a volume grating). Bragg gratings have high efficiency with little light being diffracted into higher orders. The relative amount of light in the diffracted and zero order can be varied by controlling the refractive index modulation of the grating, a property which is used to make lossy waveguide gratings for extracting light over a large pupil.

One important class of gratings is known as Switchable Bragg Gratings (SBG). SBGs are fabricated by first placing a thin film of a mixture of photopolymerizable monomers and liquid crystal material between parallel glass plates. One or both glass plates support electrodes, typically transparent indium tin oxide films, for applying an electric field across the film. A volume phase grating is then recorded by illuminating the liquid material (often referred to as the syrup) with two mutually coherent laser beams, which interfere to form a slanted fringe grating structure. During the recording process, the monomers polymerize and the mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the film. When an electric field is applied to the grating via transparent electrodes, the natural orientation of the LC droplets is changed causing the refractive index modulation of the fringes to reduce and the hologram diffraction efficiency to drop to very low levels. Typically, SBG Elements are switched clear in 30 µs, with a longer relaxation time to switch ON. Note that the diffraction efficiency of the device can be adjusted, by means of the applied voltage, over a continuous range. The device exhibits near 100% efficiency with no voltage applied and essentially zero efficiency with a sufficiently high voltage applied. In certain types of HPDLC devices magnetic fields may be used to control the LC orientation. In certain types of HPDLC phase separation of the LC material from the polymer may be accomplished to such a degree that no discernible droplet structure results. A SBG may also be used as a passive grating. In this mode its chief benefit is a uniquely high refractive index modulation.

SBGs may be used to provide transmission or reflection gratings for free space applications. SBGs may be implemented as waveguide devices in which the HPDLC forms either the waveguide core or an evanescently coupled layer in proximity to the waveguide. The parallel glass plates used to form the HPDLC cell provide a total internal reflection (TIR) light guiding structure. Light is coupled out of the SBG when the switchable grating diffracts the light at an angle beyond the TIR condition. Waveguides are currently of interest in a range of display and sensor applications. Although much of the earlier work on HPDLC has been directed at reflection holograms transmission devices are proving to be much more versatile as optical system building blocks. Typically, the HPDLC used in SBGs comprise liquid crystal (LC), monomers, photoinitiator dyes, and coinitiators. The mixture frequently includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. Both filings describe monomer and liquid crystal material combinations suitable for fabricating SBG devices.

One of the known attributes of transmission SBGs is that the LC molecules tend to align normal to the grating fringe planes. The effect of the LC molecule alignment is that transmission SBGs efficiently diffract P polarized light (ie light with the polarization vector in the plane of incidence) but have nearly zero diffraction efficiency for S polarized light (ie light with the polarization vector normal to the plane of incidence, Transmission SBGs may not be used at near-grazing incidence as the diffraction efficiency of any grating for P polarization falls to zero when the included angle between the incident and reflected light is small.

In one embodiment the gratings are recorded in uniform modulation liquid crystal-polymer material system such as the ones disclosed in United State Patent Application Publication No.: US2007/0019152 by Caputo et al and PCT Application No.: PCT/EP2005/006950 by Stumpe et al. both of which are incorporated herein by reference in theft entireties. Uniform modulation gratings are characterized by high refractive index modulation (and hence high diffraction efficiency) and low scatter. In one embodiment the gratings are recorded in a reverse mode HPDLC material. Reverse mode HPDLC differs from conventional HPDLC in that the grating is passive when no electric field is applied and becomes diffractive in the presence of an electric field. The reverse mode HPDLC may be based on any of the recipes and processes disclosed in POT Application No.: PCT/GB2012/000680, entitled IMPROVEMENTS TO HOLOGRAPHIC POLYMER DISPERSED LIQUID CRYSTAL MATERIALS AND DEVICES. The grating may be recorded in any of the above material systems but used in a passive (non-switching) mode. The fabrication process is identical to that used for switched but with the electrode coating stage being omitted. LC polymer material systems are highly desirable in view of their high index modulation.

In a birefringent grating the index has two components: extraordinary (ne) and ordinary (no) indices. The extraordinary index is defined by the optic axis (ie axis of symmetry) of a uniaxial crystal as determined by the average LC director direction. The ordinary index corresponds to the other two orthogonal axes. More generally the index is characterised using a permittivity tensor. To the best of the inventors' knowledge the optic axis in LC-based gratings tends to align normal to the Bragg fringes ie along the K-vectors. For reasonably small grating slant angles applying an electric field across the cell re-orients the directors normal to the waveguide faces, effectively clearing the grating. An incident ray sees an effective index dependent on both the extraordinary and ordinary indices with the result that the Poynting vector and wave vector are separated by a small angle. This effect becomes more pronounced at higher angles. In one embodiment the diffracted rays have a polarization state produced by aligning the average relative permittivity tensor of the grating. It is also useful to have the capability of controlling the polarization of non-diffracted light. Accordingly, in one embodiment the non-diffracted rays have a polarization state produced by aligning the average relative permittivity tensor of the grating. The polarization states may be one of randomly, linearly or elliptically polarized. In applications where the diffracted light interacts with another grating is desirable that it is linearly polarized. For example SBGs have highest diffraction efficiency for P-polarized light. In a waveguide the birefringence of the LC will tend to rotate the polarization of the light at each TIR bounce. This has the effect of scrambling the polarization of the light. Initial experiments point to the light not becoming fully randomly polarized. However, this is likely to depend on the characteristics of the birefringence. In one embodiment the permittivity tensor is modified to provide a random polarization state at the output end of the grating. Random polarization is desirable in applications in which the diffracted light is viewed directly, for example in a display.

In one embodiment the grating is one of a multiplexed set of gratings. Each grating may operate over a defined angular or spectral range. Multiplexing allows the angular bandwidth and color space to be expanded without significantly increasing the number of waveguide layers. In one embodiment the grating has a spatially varying thickness. Since diffraction efficiency is proportional to the grating thickness while angular bandwidth is inversely propagation to grating thickness allowing the uniformity of the diffracted light to be controlled. In one embodiment the grating has spatially-varying k-vector directions for controlling the efficiency, uniformity and angular range of the grating. In one embodiment grating has spatially-varying diffraction efficiency. The application of multiplexing, and spatial varying thickness, k-vector directions and diffraction efficiency in the present invention is based on the embodiments, drawings and teachings provided in U.S. patent application Ser. No. 13/506,389 entitled COMPACT EDGE ILLUMINATED DIFFRACTIVE DISPLAY, U.S. Pat. No. 8,233,204 entitled OPTICAL DISPLAYS, PCT Application No.: PCT/US2006/043938, entitled METHOD AND APPARATUS FOR PROVIDING A TRANSPARENT DISPLAY, PCT Application No. PCT/GB2012/000677 entitled WEARABLE DATA DISPLAY, U.S. patent application Ser. No. 13/317,468 entitled COMPACT EDGE ILLUMINATED EYEGLASS DISPLAY, U.S. patent application Ser. No. 13/869,866 entitled HOLOGRAPHIC WIDE ANGLE DISPLAY, and U.S. patent application Ser. No. 13/844,456 entitled TRANSPARENT WAVEGUIDE DISPLAY.

The diffracted light may be transmitted through a face of the waveguide. In a waveguide display this light would be viewed directly by the user. In other embodiments the diffracted light may continue to undergo TIR in the waveguide. For example it may interact with an output grating which provides beam expansion and diffracts the light out of the waveguide. This arrangement may be used in a waveguide display based on the principles disclosed in the above references. In one embodiment the diffracted light may be directed out of the waveguide using a prism.

In one embodiment the waveguide further comprises at least one of a waveguide input coupler for inputting light through a face of the waveguide and directing it into the first propagation path, and a waveguide output coupler for outputting the diffracted light through a face of the waveguide, wherein each of the input and output couplers is one of a grating or prism. In one embodiment at least one of the waveguide input coupler and the waveguide output coupler is a grating configured such that grating reciprocity is satisfied within the waveguide.

In one embodiment the grating is fold grating used for changing beam direction and providing beam expansion within a waveguide. This configuration would typically be use in a waveguide display of the type disclosed in the reference patent applications. Gratings designed for coupling light into or out of a waveguide are tilted around an axis lying in the waveguide plane, Fold gratings have a more generalized tilt. In their simplest implementation, as used in the present invention, they are tilted around an axis perpendicular to the waveguide plane such they deflect beams in the waveguide plane. More generally, they may have tilts defined by two rotation angles so that, for example, light can be coupled into the waveguide and deflected into an orthogonal direction inside the waveguide, all in one step. Of particular importance for the present invention, they can perform ninety degree turning and two-axis beam expansion in a single layer, avoiding orthogonal superimposed grating layers. FIG. 2 is a plan view of the fold grating 22. When the set of rays 2015 encounter the grating, they diffract in a manner that changes the direction of propagation by 90°. Unlike a conventional vertical extraction grating, the light does not leave the waveguide. Note that when a ray encounters the grating, regardless of whether it intersects the grating from above or below, a fraction of it changes direction and the remainder continues unimpeded. A typical ray will interact many times with vertically (in the Y direction) while some light will be moving laterally (in the X direction). From a design perspective, it is desirable to engineer the amount of light 2016 emerging from the output edge of the grating to be uniformly distributed laterally and the amount of light 2017 emerging from the side edge of the grating to be as small as possible.

We next consider fold grating architectures using a grating according to the principles of the invention. In the embodiments shown in FIGS. 3-4 the grating contained in a planar waveguide, that is, on with two opposing TR surfaces deflects input light in a first propagation direction into a second propagation direction. As in the embodiment of FIG. 1 the grating is designed such that portion of the upward-going TIR light interacting with the grating is diffracted into a first range of angles and a portion of downward-going TIR light interacting with the grating is diffracted into a second range of angles. The upward-going TIR light and downward-going TIR light rays are offset from the k-vector of the grating by an angle smaller than half the diffraction efficiency angular bandwidth. Turning first to the embodiment of FIG. 3, the waveguide 20 contains grating fringes 21 disposed at ninety degrees to the waveguide TIR faces and slanted in the waveguide plane, typically by 45 degrees to provide 90 degrees beam deflection. In FIG. 3A a first TIR path lies in the input propagation plane 2001 and, after diffraction in the output propagation plane 2002. TIR light 2004 in the propagation plane 2001 having a TIR angle 2005 relative to the waveguide plane normal 2006 strikes the grating fringe as an upward-going ray 2007 which is diffracted into the TIR direction 2008 lying inside the propagation plane 2002. In FIG. 3B a second TIR path in the input propagation plane 2001 indicated by 2010 has a TIR angle 2011 relative to the waveguide plane normal 2006 strikes the grating fringe as a downward-going ray 2013 which is diffracted into the TIR direction 2014 lying inside the propagation plane 2002. Since the upward-going and downward-going TIR rays are symmetric in this case there is only one peak in the output diffraction efficiency versus angle characteristic.

Figure 4A:
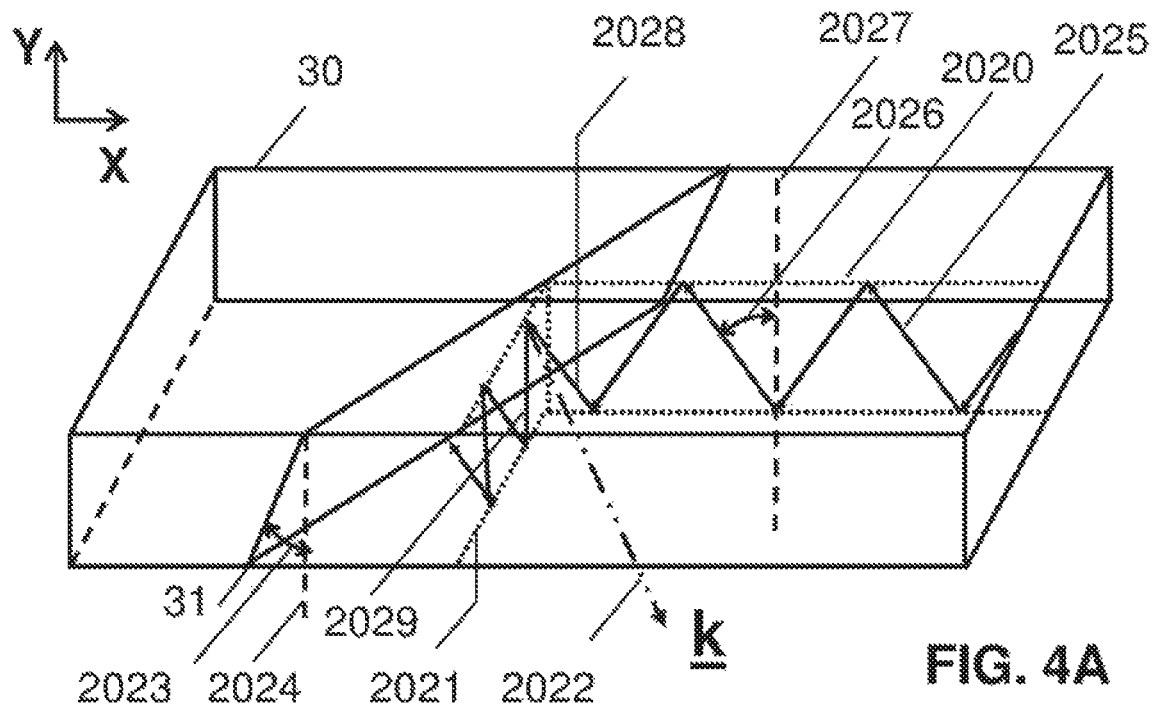
FIG. 4A is schematic illustration of a waveguide with slanted grating fringes showing a first aspect of light diffraction in one embodiment.
Figure 4B:
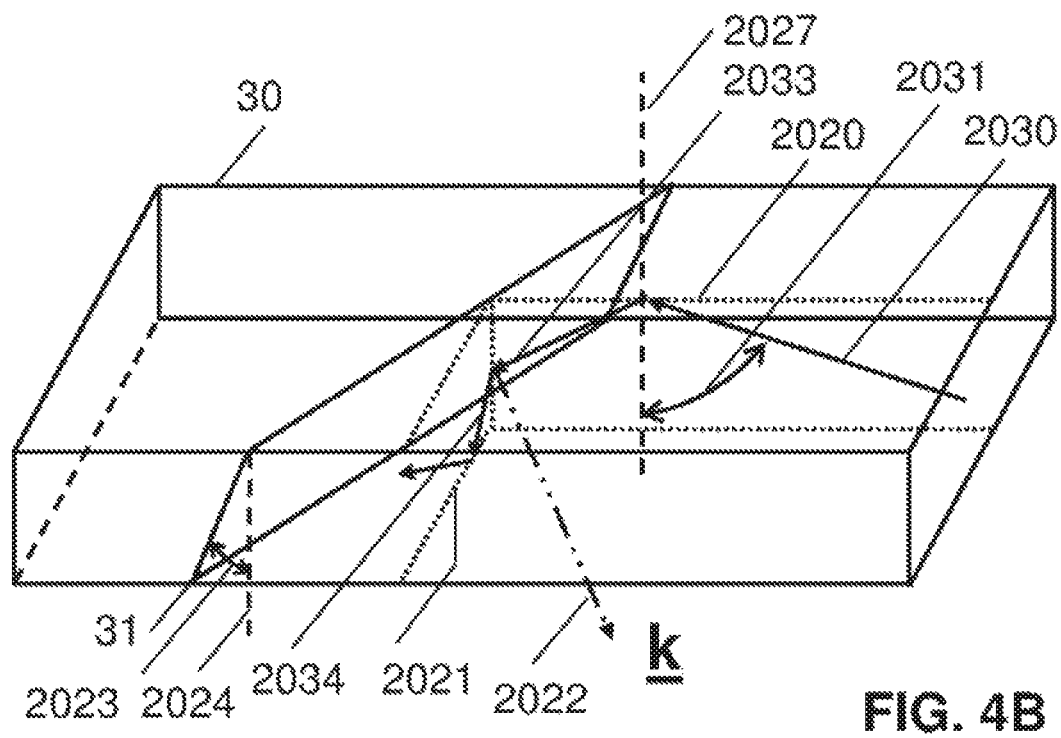
FIG. 4B is schematic illustration of a waveguide with slanted grating fringes showing a second aspect of light diffraction in one embodiment.

Turning next to the embodiment of FIG. 4, we consider a waveguide 30 containing grating fringes 31 slanted with respect to the waveguide TIR faces and relative to the waveguide plane. Again the latter will typically be 45 degrees to provide 90 degrees beam deflection. In FIG. 4A a first TIR path lies in the input propagation plane 2020 and, after diffraction in the output propagation plane 2021. The grating has a k-vector 2022 also labelled by the symbol k. The tilt angle 2023 of the grating fringes relative to the waveguide surface normal 2024 is also indicated. TIR light 2025 in the propagation plane 2001 having a TIR angle 2026 relative to the waveguide plane normal 2027 strikes the grating fringe as an upward-going ray 2028 which is diffracted into the TIR direction 2029 lying inside the propagation plane 2021. In FIG. 4B a second TIR path in the input propagation plane 2001indicated by 2030 has a TIR angle 2031 relative to the waveguide plane normal 2027 strikes the grating fringe as a downward-going ray 2033 which is diffracted into the TIR direction 2034 lying inside the output propagation plane 2021. Since the upward-going and downward-going TIR rays are asymmetric in this case there are two peaks in the output DE versus angle characteristic.

Figure 5:
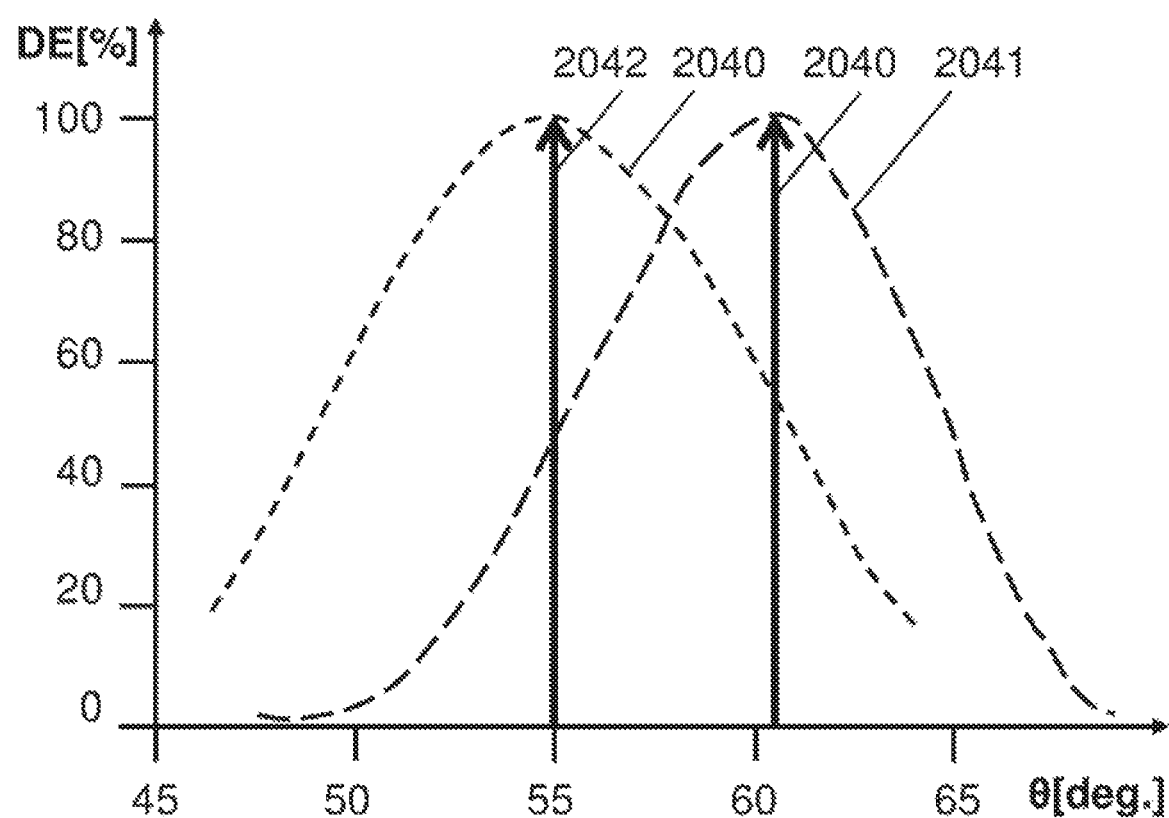
FIG. 5 is a plot of the diffraction efficiency versus angle characteristic of a waveguide grating based on the embodiment of FIGS. 4A-4B.

In one embodiment based on the embodiment illustrated in FIG. 4, a second grating overlays the first grating. The second grating deflects light in the first propagation direction into a second propagation direction within the waveguide. The second grating is characterized in that a portion of upward-going TIR light interacting with the second grating is diffracted into a third range of angles and a portion of downward-going TIR light interacting with the grating is diffracted into a fourth range of angles. The upward-going TIR light and the downward-going TIR light are offset from the k-vector of the second grating by an angle smaller than half the diffraction efficiency angular bandwidth. FIG. 5 is plot of diffraction efficiency versus angle (in waveguide) for a waveguide containing two stacked gratings based on the embodiment of FIG. 4. Each grating is configured to provide two unique efficiency versus angle characteristics; that is, four in total.

Although the invention is primarily motivated by the need to improve the angular bandwidth of a waveguide display it may also applied to other optical devices. In particular it may be applied to sensors such as eye trackers, LIDAR and biometric scanners. To this end FIGS. 1-4 may refer to a sensor waveguide if the directions of all rays illustrated are reversed. The input coupler would become an output coupler for directing signal light onto a detector. The benefit of the present invention is that the range of detection handles can be expanded to address the full angular capability of a waveguide. Wth regard to eye tracking the invention may be used in the waveguide eye trackers disclosed in PCT/GB20141000197 entitled HOLOGRAPHIC WAVEGUIDE EYE TRACKER, U.S. Provisional Patent Application No. 62/071,534 entitled HOLOGRAPHIC WAVEGUIDE FOR TRACKING AN OBJECT IN 3D SPACE, PCT/GB2013/000210 entitled APPARATUS FOR EYE TRACKING, PCT Application No. PCT/GB2013/000210 entitled APPARATUS FOR EYE TRACKING.

Figure 6:
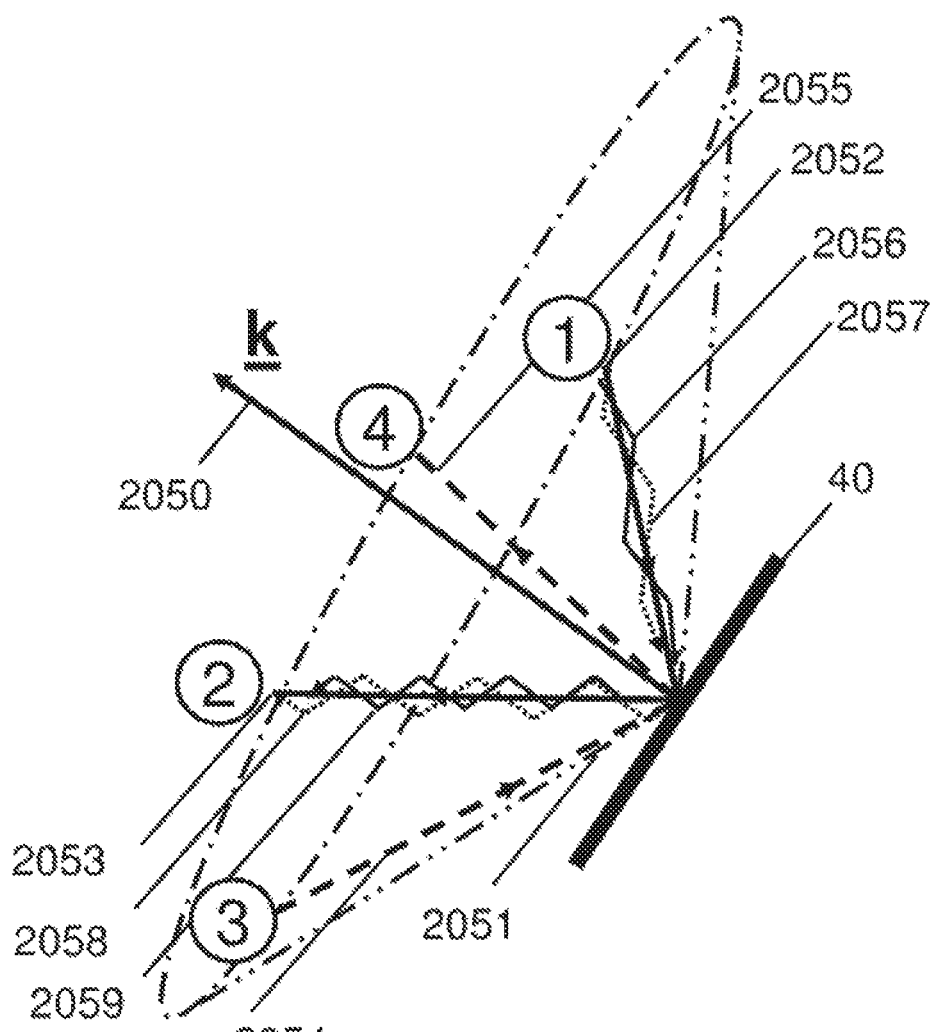
FIG. 6 is schematic illustration of a waveguide grating in one embodiment.

In one group of embodiments the waveguide grating provides at least two different light paths. As indicated above one important area of application of such embodiments is in the field of sensors. The number of light paths that can be handled by a grating waveguide will depend on the available angular bandwidth of the grating. To illustrate the basic principle of a waveguide grating providing two different light paths FIG. 6 shows a single waveguide grating fringe 40 with a k-vector 2050 which in turn provides the axis of the diffraction cone 2051. A first optical path corresponds to the first and second beam propagation direction indicated by 2052, 2053. The beams propagation paths are also labelled by the encircled numerals 1-4. A second optical path is provided by the third and fourth beam propagation directions indicated by 2054,2055. In a typical application the first optical path might be a transmit channel for transporting light from an illumination source (which is coupled to the waveguide) to a reflecting surface outside the waveguide. The second optical path would provide a receive channel for transporting reflected light from the external surface to a detector (coupled to the waveguide). To simplify the description the intervening input/output coupling gratings and other elements commonly used in waveguides are not considered.

Turning again to FIG. 6 the TIR paths around the first beam propagation direction are represented by the rays 2056,2057 and TIR baths around the third beam propagation direction are represented by rays 2058,2059. The TIR surfaces have not been illustrated. It may be helpful to visualize the latter as parallel to the plane of the drawing. Hence the beam propagation directions are substantially coplanar. As a further aid to understanding the drawings the TIR paths have been rotated by 90 degrees around the propagation direction vectors.

Figure 7:
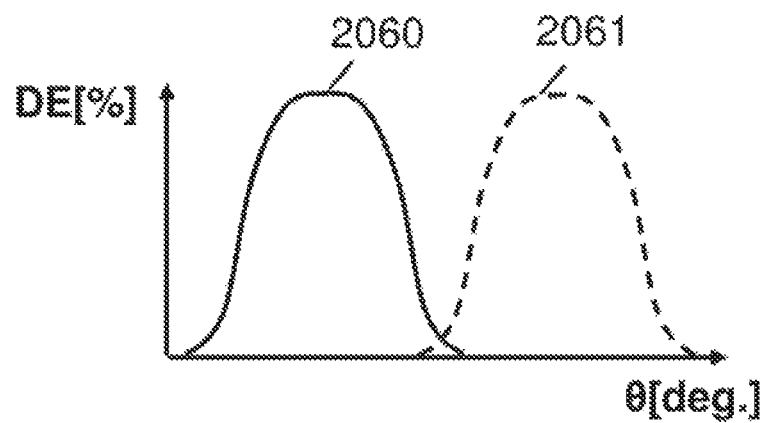
FIG. 7 is a plot showing the diffraction efficiency versus angle characteristics of a waveguide grating used in the embodiment of FIG. 6.

In FIG. 6 the propagation directions have been illustrated in as general as possible. In practice the range of directions will be determined by grating and waveguide angular bandwidth considerations as well as the constraints on where components such as light sources and detectors may be located relative to the waveguide. In one embodiment the second and third beam propagation directions may be in substantially opposing directions. This principle is used in eye trackers disclosed in the cited references. To avoid crosstalk between the receive and transmit channels it is important that the diffraction efficiency versus angle characteristics for the optical paths do not overlap substantially. In general to avoid any possible stray light paths the diffraction efficiency versus angle characteristics for all four beam propagation directions should have little or no overlap. The diffraction efficiency versus angle plots 2060,2061 for the second and third propagation directions are shown in FIG. 7. The invention allows for at least two diffractions for each of the two light paths. In the case of sensors both the receive and transmit channels may use two diffractions. However, in many applications wide angular bandwidth may only be required in the detection channel. In one embodiment the two optical paths may propagate different wavelengths. In one embodiment the two optical paths may propagate different polarization states. The ability to provide two or more optical paths through a waveguide may have applications in fields such as laser instrumentation, optical computing, robotics and industrial process control and monitoring.

In the case of waveguide displays the input light is modulated with temporally-varying angularly-distributed information content using a spatial light modulator such as a liquid crystal display panel or using a laser scanner based on MEMs or other beam deflection technology. A typical HIVID architecture is a waveguide one or more stacked input gratings for coupling in collimated light from an image generator, one fold grating, and one or more output gratings for output vertically and horizontally pupil-expanded light towards an eye box form which the full image may be viewed.

It should be emphasized that the drawings are exemplary and that the dimensions have been exaggerated. For example thicknesses of the SSG layers have been greatly exaggerated.

In any of the above embodiments the waveguides may be curved or formed from a mosaic of planar or curved facets.

A waveguide device based on any of the above-described embodiments may be implemented using plastic substrates using the materials and processes disclosed in PCT Application No.: PCT/G82012/000680, entitled IMPROVEMENTS TO HOLOGRAPHIC POLYMER DISPERSED LIQUID CRYSTAL MATERIALS AND DEVICES.

It should be understood by those skilled in the art that while the present invention has been described with reference to exemplary embodiments, it is to be understood that the invention is not limited to the disclosed exemplary embodiments. Various modifications, combinations, sub-combinations and alterations may occur depending on design requirements and other factors insofar as they are within the scope of the appended claims or the equivalents thereof.

What is claimed is:

1. An optical waveguide display comprising:
   a source of light;
   a waveguide;
   a coupler for directing light from said source of light into a total internal reflection path in said waveguide; and
   a plurality of gratings disposed within said waveguide, said plurality of gratings comprising at least one grating of a first prescription and at least one grating of a second prescription;
   wherein each grating of said first prescription is configured to provide at least two diffractions for an incident first wavelength light ray coupled into said waveguide as a diffracted ray in a first angular range and deflect the diffracted ray into a first propagation direction;
   wherein each diffraction from said grating of said first prescription provides a unique diffraction efficiency versus angle characteristic along said first propagation direction;
   wherein each grating of said second prescription is configured to provide at least two diffractions for an incident first wavelength light ray coupled into said waveguide as a diffracted ray in a second angular range and deflect the diffracted ray into a second propagation direction;
   wherein each diffraction from said grating of said second prescription provides a unique diffraction efficiency versus angle characteristic along said second propagation direction; and
   wherein said first prescription grating and said second prescription grating together provide beam expansion and extraction for said first wavelength light rays.

2. The optical waveguide display of claim 1, wherein said coupler is a grating or a prism.

3. The optical waveguide display of claim 1, wherein at least one of said plurality of gratings is a fold grating.

4. The optical waveguide display of claim 1, wherein at least one of said plurality of gratings multiplexes two or more gratings.

5. The optical waveguide display of claim 1, wherein at least one of said diffractive efficiency versus angle characteristics corresponds to diffracted rays that do not meet the condition for total internal reflection at a reflecting surface of said waveguide.

6. The optical waveguide display of claim 1, wherein said first propagation direction is orthogonal to said second propagation direction.

7. The optical waveguide display of claim 1, wherein in each grating of said first prescription and each grating of said second prescription, an incident light ray from said first angular range and its corresponding diffracted ray are each offset from said diffraction cone by an angle not exceeding half the diffraction angular bandwidth of said first prescription grating or said second prescription grating.

8. The optical waveguide display of claim 1, wherein in each grating of said first prescription and each grating of said second prescription, said diffraction efficiency versus angle characteristics do not overlap.

9. The optical waveguide display of claim 1, in each grating of said first prescription and each grating of said second prescription, said diffraction efficiency versus angle characteristics overlap.

10. The optical waveguide display of claim 1, wherein in each grating of said first prescription and each grating of said second prescription the angular separation of the diffracted rays produced in said two diffractions is equal to the diffraction cone angle.

11. The optical waveguide display of claim 1, wherein at least one grating of said first prescription and at least one grating of said second prescription is a leaky grating, providing a multiplicity of diffractions, wherein only two diffractions are characterized by a unique pair of incident and diffracted rays on said diffraction cone.

12. The optical waveguide display of claim 1, wherein at least one grating of said first prescription and at least one grating of said second prescription comprises a grating selected from the group consisting of: a Bragg grating, an electrically switchable grating, a Switchable Bragg Grating, a Holographic Polymer Dispersed Liquid Crystal (HPDLC) grating, a uniform modulation grating, a reverse mode HPDLC grating, and a surface relief grating.

13. The optical waveguide display of claim 1, wherein said diffracted light has a polarization state produced by aligning the average relative permittivity tensor of at least one grating of said first prescription and at least one grating of said second prescription, said polarization state being one of linearly, elliptically, or randomly polarized.

14. The optical waveguide display of claim 1, wherein non-diffracted light has a polarization state produced by aligning the average relative permittivity tensor of at least one grating of said first prescription and at least one grating of said second prescription, said polarization state being one of linearly, elliptically, or randomly polarized.

15. The optical waveguide display of claim 1, wherein said plurality of gratings provides a spatially variation of at least one of thickness, diffraction efficiency, or k-vector direction.

16. The optical waveguide display of claim 1, wherein said plurality of gratings are configured as an array.

17. The optical waveguide display of claim 1, wherein said waveguide comprises curved total internal reflection surfaces.

18. The optical waveguide display of claim 1, wherein said source of light provides light modulated with temporally varying angularly distributed information; and said waveguide is configured to form a pupil within which said angularly distributed information can be viewed.

19. The optical waveguide display of claim 1, wherein said optical waveguide is transparent.

20. The optical waveguide display of claim 1, further comprising:
- a second plurality of gratings for diffracting a second wavelength comprising at least one grating of a third prescription and at least one grating of a fourth prescription;
- wherein each grating of said third prescription is configured to provide at least two diffractions for an incident second wavelength light ray coupled into said waveguide as a diffracted ray in a first angular range and deflect the diffracted ray into a first propagation direction;
- wherein each diffraction from said grating of said third prescription provides a unique diffraction efficiency versus angle characteristic along said first propagation direction;
- wherein each grating of said fourth prescription is configured to provide at least two diffractions for an incident second wavelength light ray coupled into said waveguide as a diffracted ray in a second angular range and deflect the diffracted ray into a second propagation direction;
- wherein each diffraction from said grating of said fourth prescription provides a unique diffraction efficiency versus angle characteristic along said second propagation direction; and
- wherein said third prescription grating and said fourth prescription grating together provide beam expansion and extraction for said second wavelength light rays.

* * * * *